United States Patent
Gaeta

(10) Patent No.: US 8,346,823 B2
(45) Date of Patent: Jan. 1, 2013

(54) METHOD OF STORING AND ORGANIZING FILES ON A STORAGE MEDIUM VIA A FILE SYSTEM

(75) Inventor: Giovanni Gaeta, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 645 days.

(21) Appl. No.: 12/152,251

(22) Filed: May 13, 2008

(65) Prior Publication Data

US 2009/0006504 A1    Jan. 1, 2009

(30) Foreign Application Priority Data

Jun. 29, 2007  (EP) .................................... 07012758

(51) Int. Cl.
*G06F 17/30* (2006.01)
*G06F 13/00* (2006.01)
(52) U.S. Cl. ........................ 707/822; 711/170
(58) Field of Classification Search .................. None
See application file for complete search history.

(56) References Cited

U.S. PATENT DOCUMENTS

| | | | |
|---|---|---|---|
| 5,325,238 A * | 6/1994 | Stebbings et al. | 360/15 |
| 5,890,169 A | 3/1999 | Wong et al. | |
| 5,926,821 A * | 7/1999 | Hirose et al. | 1/1 |
| 6,745,311 B2 | 6/2004 | Fabrizio et al. | |
| 7,464,238 B1 * | 12/2008 | Yadav | 711/162 |
| 2002/0138505 A1 | 9/2002 | Fabrizio et al. | |
| 2004/0254907 A1 * | 12/2004 | Crow et al. | 707/1 |
| 2005/0234847 A1 * | 10/2005 | Damien et al. | 707/1 |
| 2007/0016631 A1 * | 1/2007 | Robert et al. | 707/204 |
| 2007/0283119 A1 * | 12/2007 | Sarkar et al. | 711/170 |
| 2008/0005468 A1 * | 1/2008 | Faibish et al. | 711/114 |
| 2008/0126704 A1 * | 5/2008 | Ulrich et al. | 711/114 |
| 2008/0162418 A1 * | 7/2008 | Morris et al. | 707/2 |

FOREIGN PATENT DOCUMENTS

WO    WO 99/15954 A1    4/1999

OTHER PUBLICATIONS

European Office Action dated Jun. 24, 2010.

* cited by examiner

*Primary Examiner* — Tarek Chbouki
(74) *Attorney, Agent, or Firm* — Laurence A. Greenberg; Werner H. Stemer; Ralph E. Locher

(57) ABSTRACT

In order to face fragmentation, a method for storing and organizing files on a storage medium via a file system reserves on the storage medium a non-fragmented segment for taking up a file by storing within the file system an identification of an address range of the segment. The file is written within the segment and information is stored in the file system. The information is suited to find the file. The size of the segment is derived by statistical methods from file sizes of a kind of the file.

11 Claims, 2 Drawing Sheets

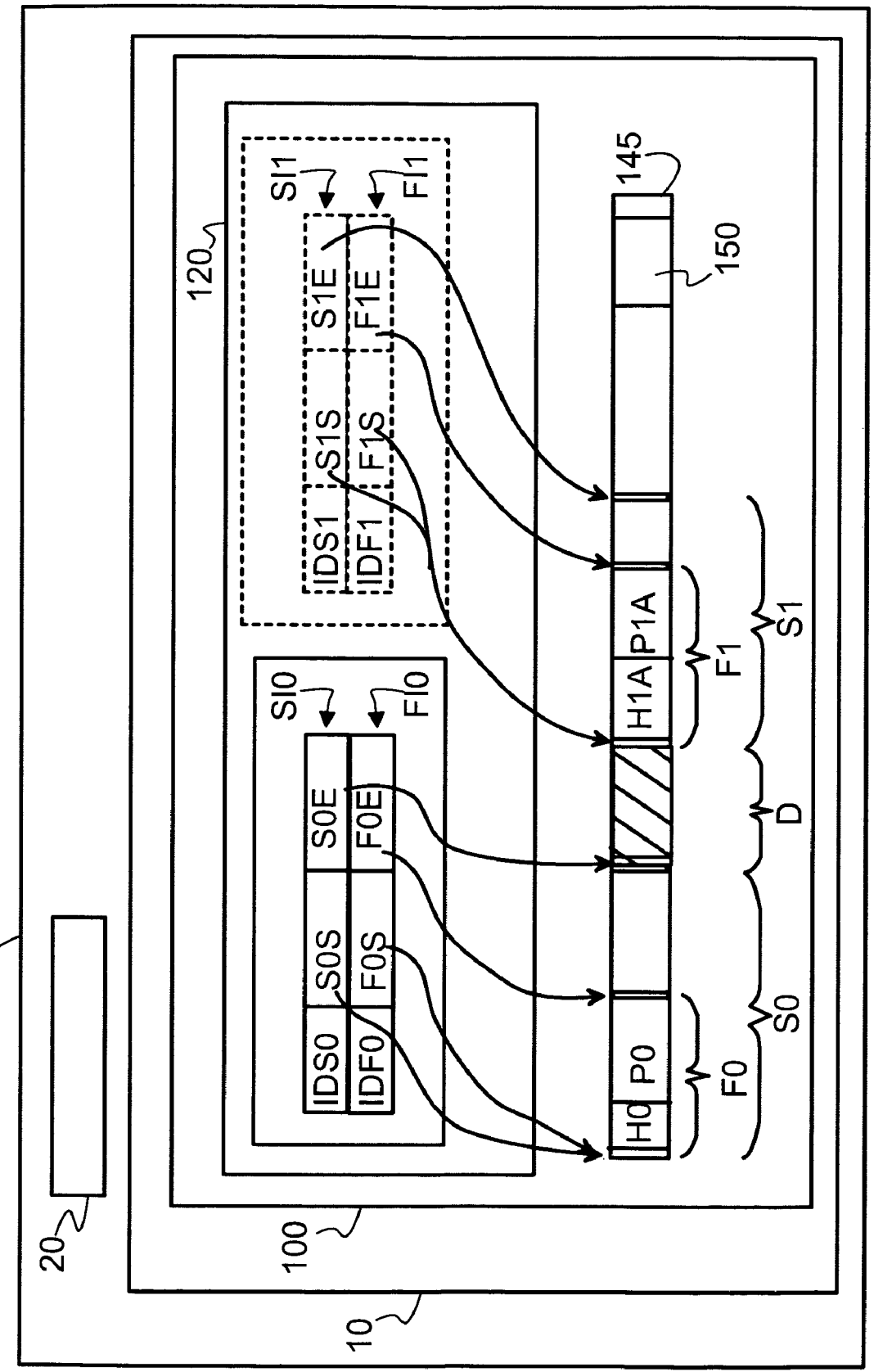

METHOD OF STORING AND ORGANIZING FILES ON A STORAGE MEDIUM VIA A FILE SYSTEM

BACKGROUND OF THE INVENTION

The present invention relates to file systems for storing and managing data files on a storage medium.

File systems are used for managing files on a storage device, for example, on a hard disc drive, floppy disc drive, flash memory, or rewritable optical media. In order to find a file, the file system usually comprises a file allocation database (e.g., the file allocation table (FAT) for Microsoft® Disk Operating Systems (MSDOS)). A typical approach thereby is, that upon generation of a new file, information is stored within the file allocation database in order to localize the file and in order to prevent overwriting of the file by other data. In most file systems, said information is stored by means of pointers, i.e., variables that indicate an address on the storage device.

In a simple example according to the state of the art, a file is written in an non-fragmented segment of the storage device and a pointer indicating the beginning of the file and another pointer indicating the end of the file is written within the file allocation database. The information within the pointers is used to access the file and to prevent that the data file is overwritten by other data.

However, in nowadays computer systems, files often are fragmented and get increasingly fragmented by writing new files and changing files on the storage device. This is especially the case for incremental files. Incremental files are files that grow in steps, for example by appending new information to an existing file. A typical example of incremental files are log-files. When new data is to be appended to an existing file, it might happen that the memory adjacent to the existing file is not free anymore, since between generation of the file and appending new information to the file, other data might have been written on the memory. State of the art file systems therefore write data that is to be appended to a file into a free segment that does not necessarily immediately adjoin to the existing file.

In order to prevent overwriting of a fragmented file, the file system therefore has to keep track of the file fragments, which is usually done by mapping the segmentation onto the file allocation database. However, fragmentation of the files on the storage device results in decreased performance. Known operating systems delegate this problem of the decreased performance to the file system maintenance, in particular to disc defragmentation tools.

However, for a large storage device, defragmentation tools need considerable time for defragmentation. A drawback of this solution is, that during the process of defragmentation a computer system should not be used for other purposes, since an error in the defragmentation process can result in data loss and in an unstable operating system.

An additional drawback of state of the art file systems is that in case information is appended to a file, the file allocation database needs to be updated in order reserve the memory space taken by the additional data, thus preventing the additional data to be overwritten by other files.

SUMMARY OF THE INVENTION

There is, therefore, a need for overcoming, or at least reducing the above mentioned drawbacks. Accordingly, one aspect involves a method of storing and organizing files on a storage medium via a file system. Thereby a non-fragmented segment on the storage medium is reserved for taking up a file. The segment is reserved by storing an identification of the address range of the segment within the file system. The size of the segment is derived by means of statistical methods from file sizes depending on the kind of the file. Before, during or after reservation of the segment, the file is written within the segment. Additionally, an information that is suited to find the file is stored within the file system.

In a preferred embodiment, the kind of the file is defined by the format of the file, in which the file is encoded. Preferred examples of file formats are text files (.txt), formats for data bases, files written in extensible markup language (.xml), which are often used for log files. Other examples are audio files or video files, for example encoded in audio video interleave (.avi), especially for audio files or video files that grow continuously or in steps for example in a video survey.

In another preferred embodiment, the kind of the file is defined by a task to which the file contributes. A preferred examples is an incremental file, which grows in steps by adding new data to an existing file. A particularly preferred example is a log-file, which serves for logging events of a specific kind, such the accessing of a computer, or the accessing of a program, process or resource of a computer. Another preferred example for a log-file is a file that logs attack from a network.

In another advantageous embodiment, the size of the segment is the average size a file of the said kind achieves after a defined time. This results in a good compromise not to reserve too much memory which could be used for other data but still to have a good chance that no or only very little fragmentation is necessary over the lifetime of the file.

In another advantageous embodiment the file is enlarged within the reserved segment, by appending additional data to the file. This can be done for example by appending new data to a log file. In case that the end of the file is indicated within a header of the file (and only optionally within the file allocation database) it is an additional advantage of the invention that the file allocation database does not need to be amended, since the reserved segment is not changed. Other data that is written subsequently on the storage device will not be written within the reserved space and will thus not overwrite or amend in another way the file within the reserved segment.

However, for redundancy reasons and in order to access a file more rapidly, updating the information within the file system according to the enlarged file is an another advantageous embodiment.

According to another preferred embodiment the file is enlarged by appending additional data to the file until the file gets too large to be contained within the reserved segment. In order to store all data that is to be appended to the file, a non-fragmented further segment with a size that is derived by means of statistical methods from file sizes of the kind of the file is reserved. The further segment is reserved by storing within the file system a further identification of a further address range of said further segment.

In order to reduce system resources, the statistical methods for deriving the size of the segment and/or the statistical methods for deriving the size of the further segment are performed by means of a database (for example a table), which assigns to the kind of file a value for the size of the segment. The size of the segments can therefore be evaluated previously outside of the file system according to experience values. For example, an average size of a log-file for logging attacks from a network connection can be evaluated previously for the life-span of a computer system. This average size can be used as the size of the reserved segment in order to guarantee little fragmentation of the file. In case the size of the segment is chosen for example twice the average size of the log-file, there is a good chance to have no fragmentation at all over the lifespan.

The sizes of log files can strongly depend on the specific settings of a computer system. As an example, in the above mentioned example, it makes a difference in the number of attacks from the network if the computer system is connected permanently by means of a broadband connection to the internet or only occasionally via a narrow-band dial-up connection. According to another preferred embodiment the statistical methods for deriving the size of the segment and/or the statistical methods for deriving the size of the further segment are therefore performed by the file system or by a computer system that comprises the file system.

In another preferred embodiment, some method steps are implemented as a software layer that is built on an existing file system. This has the advantage of starting to use this technique on existing data without startup issues, which would otherwise generate additional costs. This is especially the case if upon a media many files managed are. For example, for the Microsoft New Technology File System® (NTFS) or any other file system, the invention can be performed by simply installing the software layer upon the file system.

BRIEF DESCRIPTION OF THE SEVERAL VIEWS OF THE DRAWINGS

The novel features and method steps characteristic of the invention are set out in the claims below. The invention itself, however, as well as other features and advantages thereof, are best understood by reference to the detailed description, which follows, when read in conjunction with the accompanying drawings, wherein:

FIG. 2 shows a hardware system, having implemented another preferred embodiment.

DETAILED DESCRIPTION OF THE INVENTION

Figure 1:
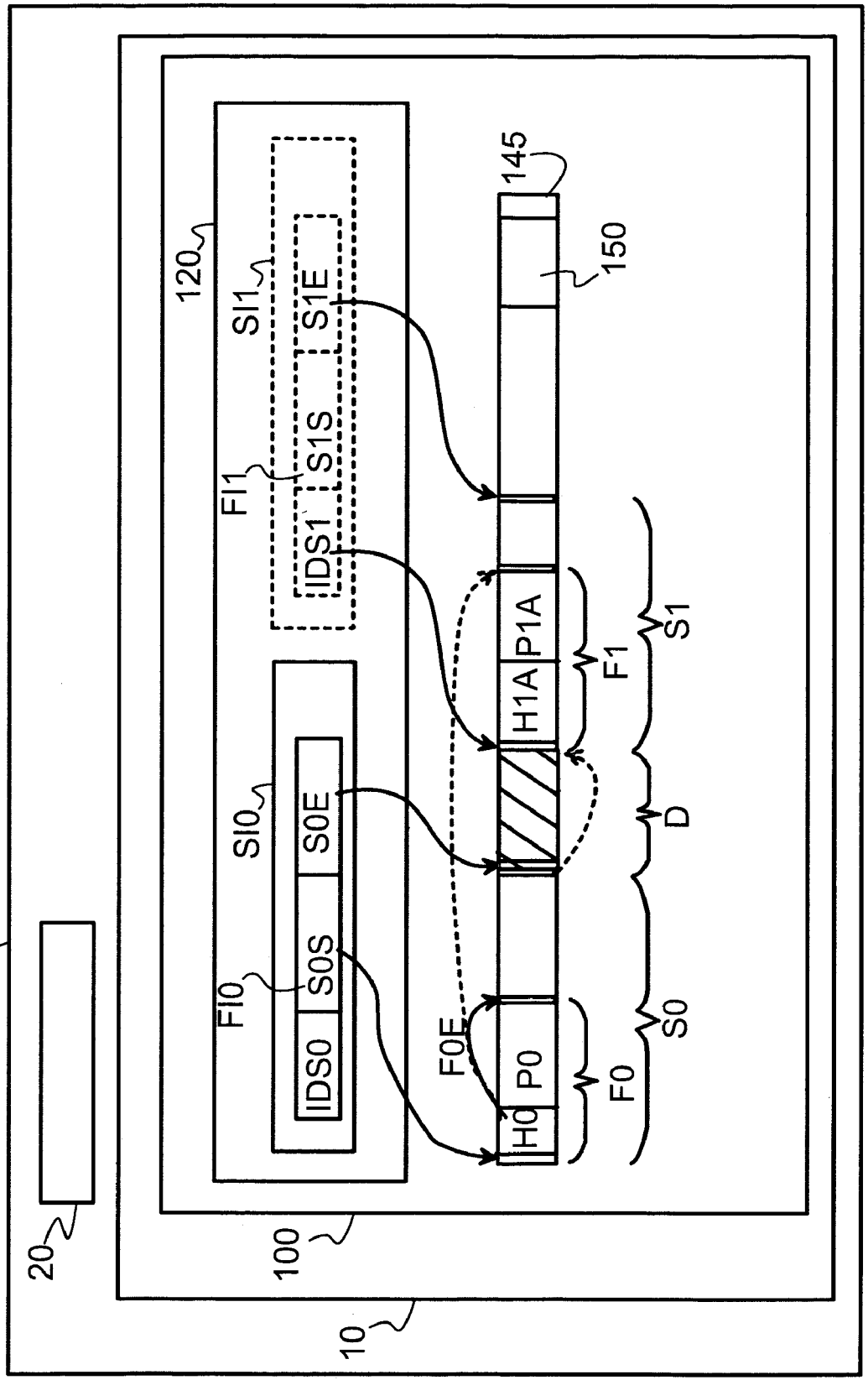
FIG. 1 shows a hardware system, having implemented a preferred embodiment.

FIG. 1 shows a hardware system 1, for example a computer, comprising a storage medium 10, a processing unit 20. The storage medium 10 comprises a file system 100. The file system 100 comprises a file allocation data base 120 and an addressable memory 145 for storing other data, for example program files and data files.

In order to perform an embodiment of the claimed method, a non-fragmented segment S0 on the storage medium is reserved for taking up a file F0. The segment S0 is reserved by storing an identification SI0 of the address range of the segment S0 within the file allocation data base 120. The identification SI0 comprises an identification code IDS0 of the segment S0, an address S0S indicating the start address of the segment and an address S0E indicating the end address of the segment. The identification SI0 serves to identify the segment S0 and to distinguish the segment S0 from other segments that are managed within the file allocation data base 120. The size of the segment S0 is derived by means of statistical methods from file sizes depending on the kind of the file F0. In this preferred embodiment, the file F0 is a specific log file and the size of the segment S0 is chosen to be an average size of the log file F0 after the average lifespan of the kind of the specific log file.

After reservation of the segment S0, the file F0 is written within the segment S0. In this embodiment the start of the file F0 is chosen to be the start of the segment S0. The information FI0 that is suited to localize the file is therefore the address S0S where the segment starts together with the Identification IDS0. However, this information can also be written redundantly into the file allocation data base as an assignment of a file-ID to a start address of the file. Also in this kind of embodiments the file can be written anywhere within the sector, but in order to find the file, this requires to write a different information than the start of the segment into the file allocation data base.

It can happen that in special situations already when created, the file F0 is larger than the average size of this kind of file. In such situations, the size of the reserved segment S0 is preferably adapted, by choosing the size of the segment S0 large enough to take up the whole file F0. As an example, the reserved segment S0 can be chosen to have a size that is larger than size of the file F0 in order to take up future data that is appended to the file F0. As an example, the size of the segment S0 can be chosen twice the size of the initial file F0.

An address F0E of the end of the file can also be written into the file allocation data base, in order to access the file at a later time. This has the advantage, that at a later time additional information can be appended more quickly to the file. However, other solutions are also possible. Instead of writing the address F0E into the file allocation data base, the address F0E can also be written into a header H0 of the file. The payload of the file F0 is indicated with the reference sign P0.

As can be seen in FIG. 1, the reserved segment S0 is larger than the file F0. Due to events which have to be logged into the file F0, additional data is appended to the file F0. In a preferred embodiment, upon each appending of additional data to the file F0, the address F0E of the end of the file is therefore always updated within the file allocation database 120. This has the advantage, that the appending of the additional data does not require analysis of the file header H0 of the File F0.

In case the file F0 gets too large due to the appending of additional data, two situations might occur: According to the first case the space adjacent to the reserved segment S0 following the address S0E is free. In a preferred embodiment the segment S0 is enlarged by amending within the file allocation data base 120 the value of the address S0E where the segment ends. Of course, the necessary set of routines 150 has to take care that no other files or reserved segments are affected.

According to the second case, the space adjacent to the reserved segment S0 following the address S0E is used by other data D. According to another preferred embodiment, a further non-fragmented segment S1 is reserved on the addressable memory 145 in case the file F0 gets too large to be contained within the reserved segment S0. The size of the further segment S1 is chosen to be of a size that is derived by means of statistical methods from file sizes of the kind of the file. The reservation of the size is made by storing within the file allocation database 120 a further identification SI1 of a further address range of the further segment S1. The reservation of the further segment S1 can be done with methods that are equivalent to the methods for reserving segment S0. As an example, the identification SI1 comprises an identification code IDS1 of the further segment S1, an address S1S where the further segment S1 starts and an address S1E where the further segment S1 ends. In case the file fragment F1 which comprises the additional data within the further segment S1 starts at the same address S1S as the segment S1, the information FI1 for finding the file fragment F1 is given by the start address S1S together with the identification code IDS1S of the further segment S1.

Upon each modification of the size of a file, if necessary, the information indicating the end of the file has to be modified. In the example described in FIG. 1, upon adding additional data to the further segment F1, the pointer within the header of the file fragment F0 indicating the address F0E of the end of the file is overwritten with the address F1E, now pointing to the new end address of the file, as depicted in FIG. 1 according to the dashed line. Of course, the real end of file has to be changed each time the file is changed, also if additional data is be added without the need of generating a new segment.

In order to assemble the data F0 within segment S0 and the data F1 within the segment S1, information within the file system needs to be modified and/or added. In the example of FIG. 1, a pointer indicating the start address of the further segment S1 is written at the end of the initial segment S0. This way, when reading a file, the file system knows how to assemble data correctly.

FIG. 2 shows a hardware system, having implemented another preferred embodiment. In contrast to the embodiment of FIG. 1, the embodiment of FIG. 2 has implemented all information which is necessary for reading out a file, appending data to a file and for assembling file fragment, within the file allocation data base. Of course this information can be hold redundantly within the segments S0, S1. In the example of FIG. 2, for each segment S0, S1, a set of the following values is written into the file allocation data base:

An identifier of the segment IDS0, IDS1. In a preferred embodiment this identifier also holds an information how to assemble the segments.

An identifier of the start address of the segment S0S, S1S.

An identifier for the end address of the segment S0E, S1E.

An identifier of the file fragment IDF0, IDF1. In a preferred embodiment this identifier also holds an information how to assemble the segments. An information, where the file fragment starts within the segment F0S, F1S.

An information, where the file fragment ends within the segment F0E, F1E.

In another preferred embodiment also all necessary information is stored within the file allocation data base, but within a single data structure for each different file. Such a structure can for example be of the form: File identifier, start address of the first segment, end address of the first segment, start address of the first file fragment, end address of the first fragment, start address of the second segment, end address of the second segment, start address of the second file fragment, end address of the second file fragment. Of course, solutions with more than two reserved segments can be extended in an analogous manner.

In yet another preferred embodiment, a set 150 of routines comprises a routine that manages the reservation of the segment are stored on the storage device 10. In another more specified preferred embodiment, the set of routines 150 comprises routines for accessing and writing files on the addressable memory 145 and for updating the file allocation database according to amendments in the addressable memory.

According to another preferred embodiment, the size of the reserved segment S0 and/or the size of the further segment S1 is chosen to be a multiple of a cluster size, e.g., a disk cluster size. This can for example be done by rounding up or rounding down a size that was evaluated by statistical methods.

Of course, in the described embodiments, reservation of the further segment is only necessary if the initial segment is too small for holding all data of the file.

In case the further segment gets too small for holding the additional data, more further segments can be reserved analogously to the reservation of the further segment.

What is claimed is:

1. A method of storing and organizing files on a storage medium via a file system, comprising:
reserving on the storage medium a non-fragmented segment for taking up a file by storing within the file system an identification of an address range of the segment, wherein the reserving step is implemented as a software layer that is built on the file system;
writing the file within the segment and storing information in the file system, said information being suited to find the file;
appending additional data to the file that is written within the segment to obtain an enlarged file in the segment;
storing a header of the enlarged file in the segment and indicating an end of the enlarged file within the header of the enlarged file;
wherein a size of the segment is derived from statistically identified file sizes of a kind of the file by selecting an option selected from the group consisting of:
i) the kind of the file is defined by a format of the file in which the file is encoded,
ii) the kind of the file is defined by a task to which the file contributes, and
iii) the size of the segment is an average size that is obtained by the kind of the file after a defined time; and
setting the size of the segment based on an average size that is obtained by a plurality of files after a defined time;
wherein the plurality of files are located outside the file system and are all of a kind that is the same as the kind of the file that is to be written within the segment.

2. The method of claim 1, further comprising enlarging the file within the segment by appending additional data to the file.

3. The method of claim 1, further comprising:
enlarging the file by appending additional data to the file until the file becomes too large to be contained within the reserved segment;
reserving a further non-fragmented segment with a size that is derived by statistical methods from file sizes of the kind of the file, said further segment being reserved for taking up the additional data that does not fit into the original segment, the further segment being reserved by storing within the file system a further identification of a further address range of the further segment.

4. The method of claim 2, further comprising updating the information within the file system upon the enlarging of the file.

5. The method of claim 1, wherein the statistical methods for deriving the size of the segment and/or of a further segment are performed by using a database that assigns to the kind of file a value for the size of the segment.

6. The method of claim 1, wherein the statistical methods for deriving a segment size are performed by one of the file system and a computer system that comprises the file system.

7. The method of claim 1, wherein the kind of file is one of a log-file, a video file and a file encoded in extensible markup language (xml).

8. The method of claim 1, wherein an end of an enlarged file is indicated within a file allocation database of an existing file system.

9. The method of claim 1, wherein the file that is stored on the storage medium can be any one of a plurality of different kinds of files that are stored on the storage medium.

10. The method of claim 1, comprising, for each kind of a plurality of different kinds of files being stored on the storage medium, using a statistical method to determine a size of a non-fragmented segment on the storage medium that will store the kind of the plurality of different kinds of files.

11. The method of claim 1, which comprises: indicating the end of the enlarged file within the header of the enlarged file.

* * * * *